United States Patent
Kim et al.

(10) Patent No.: US 6,397,087 B1
(45) Date of Patent: May 28, 2002

(54) DEVICE FOR CONTROLLING THE CONNECTION OF A BUILT-IN TYPE EAR-MICROPHONE FOR PORTABLE RADIO TERMINAL

(75) Inventors: Dong-Ho Kim; Jung-Wook Hwang, both of Suwon (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/436,290

(22) Filed: Nov. 8, 1999

(30) Foreign Application Priority Data

Nov. 7, 1999 (KR) ............................................. 99-47903
Nov. 7, 1999 (KR) ............................................. 99-47904

(51) Int. Cl.[7] ................................................ H04B 1/38
(52) U.S. Cl. ........................ 455/569; 381/74; 381/110; 455/568; 455/90
(58) Field of Search ................................ 455/550, 568, 455/569, 90; 381/74, 91, 92, 110, 111, 122, 361, 375

(56) References Cited

U.S. PATENT DOCUMENTS 5,487,182 A * 1/1996 Hansson
5,642,424 A * 6/1997 Masaki
5,978,689 A * 11/1999 Tuoriniemi et al.
6,069,960 A * 5/2000 Mizukami et al.
6,181,801 B1 * 1/2001 Puthuff et al.

* cited by examiner

Primary Examiner—Nguyen T. Vo
Assistant Examiner—Nghi H. Ly
(74) Attorney, Agent, or Firm—Dilworth & Barrese, LLP

(57) ABSTRACT

A device for controlling connection of a built-in type ear-microphone for a portable radio terminal includes a vocoder, which has the speaker and microphone amplifier of the portable radio terminal and an ear-microphone amplifier; a first logic combination means for logically combining a signal output from the speaker amplifier and a signal output from the ear-microphone amplifier so as to prevent generation of noises due to short-circuit of a microphone signal and a speaker signal while an earphone plug is inserted in an earphone jack; a comparator for comparing an electric signal sensed at the earphone jack with a reference voltage; a second logic combination means for logically combining an output of the first logic combination means and an output of the comparator to generate a jack detection signal; and a central processing unit for generating a control signal for enabling the vocoder to switch an audio signal path to the ear-microphone amplifier, upon detection of the jack detection signal during a call.

8 Claims, 10 Drawing Sheets

DEVICE FOR CONTROLLING THE CONNECTION OF A BUILT-IN TYPE EAR-MICROPHONE FOR PORTABLE RADIO TERMINAL

This application claims priority to an application entitled "Device for Controlling Connection of Built-in Type Ear-Microphone for Portable Radio Terminal" filed in the Korean Industrial Property Office on Nov, 7, 1998 and assigned Serial No. 98-47903, and an application entitled "Circuit for Controlling the Connection of a Built-in Type Earphone-Microphone for Portable Radio Terminal", filed in the Korean Industrial Property Office on Nov. 7, 1998 and assigned Serial No. 98-47904, the contents of which are hereby incorporated by reference.

BACKGROUND OF THE INVENTION

1. Field of the Invention

The present invention relates generally to a portable radio terminal, and in particular, to a device for controlling the connection between a built-in type ear-microphone and a portable radio terminal.

2. Description of the Related Art

An ear-microphone used with a portable radio terminal can be classified into either an internal (or built-in) type or an external type. The built-in type ear-microphone commonly includes a three-pole type plug which is inserted into a jack typically on the top or side of the portable radio terminal. An external type ear-microphone includes a plug which is inserted into an interface connector mounted at the bottom of the portable radio terminal.

FIG. 1A is a perspective view illustrating the connection between a built-in type ear-microphone and a portable radio terminal, and FIG. 1B is a perspective view illustrating the connection between an external type ear-microphone and a portable radio terminal. FIG. 2 illustrates a conventional device for controlling connection of the built-in type ear-microphone.

Referring to FIGS. 1A and 2, when the plug 200 of a built-in ear-microphone is mechanically connected to an ear-microphone jack 100, the user can make a telephone conversation through the ear-microphone. As stated above, the ear-microphone jack 100 is typically located at the top or side of the terminal. More specifically, as shown in FIG. 2, the ear-microphone jack 100 has pins 1, 3 and 2, which are connected to ground node G, speaker node S and microphone node M, respectively. Therefore, a microphone 250 and a speaker 260 of the ear-microphone are electrically connected to a microphone amplifier AMP1 and a speaker amplifier AMP2 prepared in a vocoder 130, respectively, allowing the user to make a telephone conversation. A comparator COM1 compares an electric signal sensed at a pin 4 in the ear-microphone jack 100 with a reference voltage $V_{ref}$ to generate a jack detection signal JD1 representative of whether or not the plug 200 is inserted into the jack 100. In addition, the jack detection signal JD1 is an initial detection signal for generating a signal having a level appropriate for the ear-microphone.

FIG. 3 illustrates a conventional external type ear-microphone. An interface connector 140 mounted at the bottom of the terminal includes ports 140a and 140b for connection of the ear-microphone. Though not shown, the interface connector 140 further includes ports for a hands-free kit and ports for data communication. More specifically, when a plug 230 shown in FIG. 1B is inserted into the interface connector 140, the microphone 250 and the speaker 260 are electrically connected to the microphone amplifier AMP1 and the speaker amplifier AMP2 prepared in the vocoder 130, respectively, thus allowing the user to make a telephone conversation.

When the built-in type ear-microphone, which is commonly used in code division multiple access (CDMA) portable radio terminals, is inserted during the telephone conversation, unpleasant noises are generated. This is because the microphone is instantaneously short-circuited to the speaker when the ear-microphone is inserted.

Meanwhile, GSM portable radio terminals employing a time division multiple access (TDMA) technique have the following problems in addition to the problems mentioned above.

In general, the external type ear-microphone is typically used with TDMA portable radio terminals, while the built-in type ear-microphone is typically used with CDMA portable radio terminals. This is because, while the CDMA terminal has a low instantaneous power consumption of 0.6 W, the TDMA terminal has a high instantaneous power consumption of 2 W, thereby causing a degradation of audio quality due to TDMA noises. Another reason that the external type ear-microphone is used with TDMA terminals is that TDMA terminals lack internal space. However, the external type ear-microphone used with GSM portable radio terminals is unhandy to carry about and restricts movement of the user, because the ratio of the size of the plug to the size of the portable radio terminal is very high.

In addition, when using the ear-microphone, the GSM terminal cannot use the interface connector for other uses. For reference, to solve the problem of the external ear-microphone, Nokia company has proposed a TDMA portable radio terminal which uses the built-in type ear-microphone by employing a single ended technique which is used in CDMA portable radio terminals. In the single ended technique, a voice signal and the other mode is used as a ground. By contrast, in the double ended technique, both nodes are used to transmit the voice signal, however, there is a phase difference between the nodes. Although the single ended built-in type ear-microphone is effective in detecting switching of the ear-microphone, it is susceptible to TDMA noises, causing deterioration of audio quality. Unfavorably, employment of the single ended technique causes a decrease in volume of the audio. The double ended technique is less susceptible to TDMA noises than the single ended technique because the noise is more readily canceled, however, it requires two speakers and two microphones.

FIG. 4 illustrates a device for controlling connection of a single ended ear-microphone. Referring to FIG. 4, the conventional device includes a 3-pole 5-node earphone jack 430 into which an earphone plug is inserted; a vocoder 400 for processing audio signals input and output to/from an earphone, and a speaker and a microphone of the terminal; a reference voltage generator 410 for generating a reference voltage; and a voltage comparator 420 for comparing a variation in voltage, which happens when the earphone plug is inserted in the earphone jack 430, with the reference voltage generated. from the reference voltage generator 410, to notify the controller of the insertion of the earphone plug. Therefore, in the TDMA portable radio terminal, it is very difficult to implement a built-in type ear-microphone which is insusceptible to the TDMA noises.

Therefore, there is a need for a device that controls the connection of a built-in type ear-microphone, which can prevent the unpleasant noises generated in the CDMA terminal, and have reduced susceptibility to the TDMA noises generated in the GSM terminal.

SUMMARY OF THE INVENTION

It is, therefore, an object of the present invention to provide a device for controlling the connection of an ear-microphone, which is handy to carry about, with a portable radio terminal, and for preventing generation of unpleasant noises even when the ear-microphone is inserted during telephone conversation.

It is another object of the present invention to provide a device for connecting an ear-microphone, which can be built in a TDMA portable radio terminal and minimize susceptibility to TDMA noises.

It is further another object of the present invention to provide an earphone device which can detect switching and insertion of an earphone.

It is still another object of the present invention to provide a device for controlling the connection of a double ended ear-microphone with a TDMA portable radio terminal.

In accordance with one embodiment of the present invention, a device for controlling the connection of a built-in type ear-microphone with a portable radio terminal, comprises a vocoder including the speaker and microphone amplifiers of the portable radio terminal and the ear-microphone amplifier; a first logic combination means for logically combining a signal output from the speaker amplifier and a signal output from the ear-microphone so as to prevent generation of noises due to the short-circuit of the microphone signal and the speaker signal when the ear-microphone plug is inserted in the ear-microphone jack; a comparator for comparing an electric signal sensed at the ear-microphone jack with a reference voltage; a second logic combination means for logically combining the output-of the first logic combination means and the output of the comparator to generate a jack detection signal; and a central processing unit for generating a control signal for enabling the vocoder to switch an audio signal path to the ear-microphone amplifier, upon detection of the jack detection signal during a call.

In another embodiment of the present invention, a device for controlling the connection of a built-in type ear-microphone with a time division multiple access (TDMA) portable radio terminal, comprises a vocoder, including positive and negative nodes for a speaker and a microphone, for processing audio signals input and output from and to the nodes; a doubled ended 4-pole 6-node earphone jack for connecting, upon insertion of an earphone plug, a positive line of an ear-microphone to a microphone positive node of the vocoder through a first node, connecting a negative line of the ear-microphone to a microphone negative node of the vocoder through a second node, and disconnecting the second node from a third node; and a voltage comparator for comparing a voltage input through the first or third node with a reference voltage, in order to detect the switching of an earphone switch and insertion of the earphone plug.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

Figure 1A:
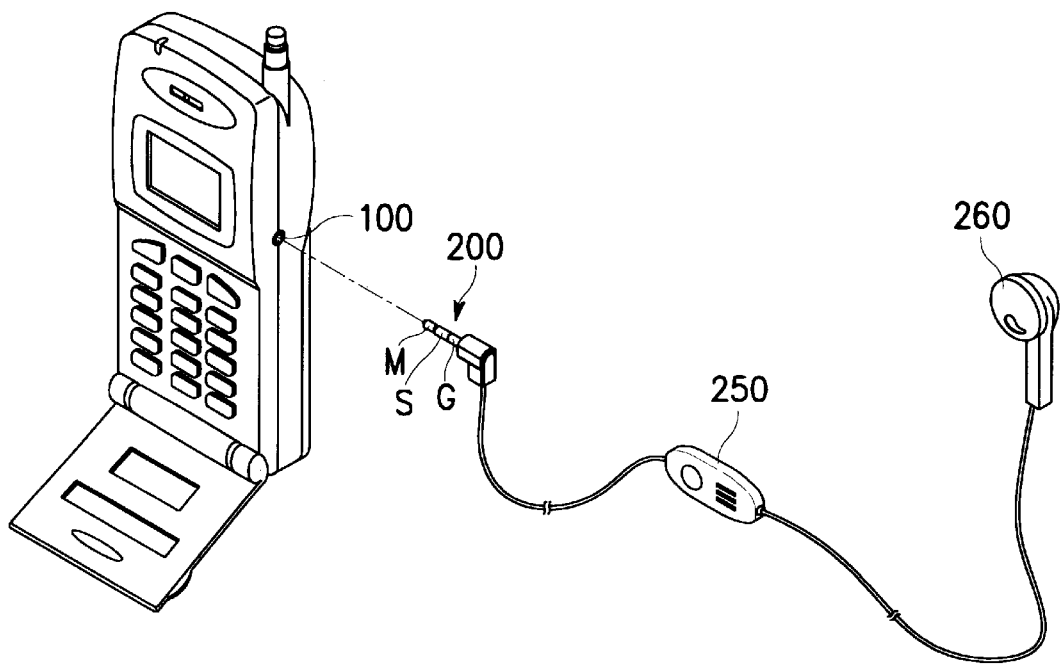
FIG. 1A is a perspective view illustrating the connection between a portable radio terminal and a built-in type ear-microphone.
Figure 5:
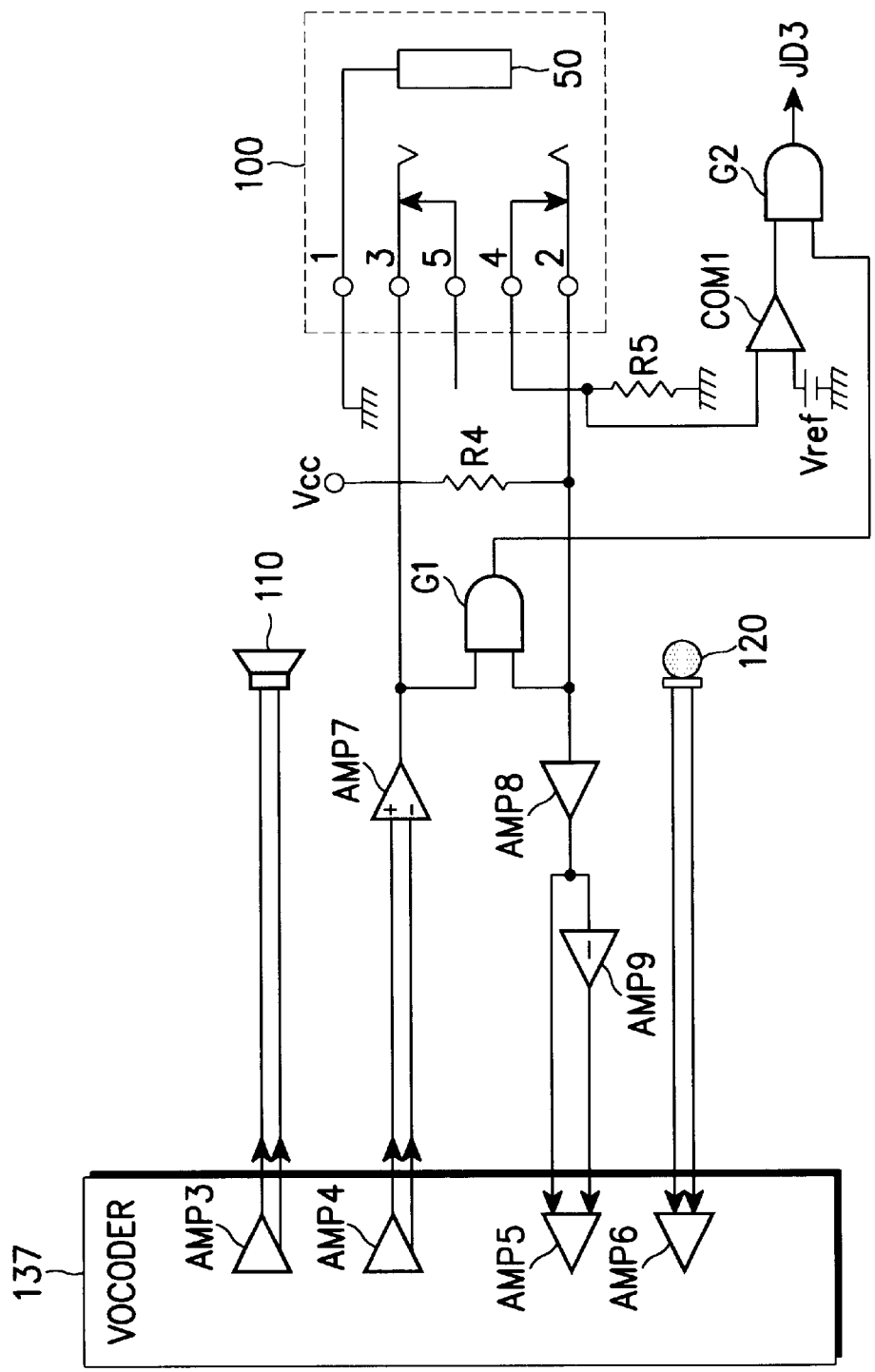
FIG. 5 is a diagram illustrating a device for connecting a built-in type ear-microphone to a portable radio terminal according to a first embodiment of the present invention.

FIG. 5 illustrates a device for controlling the connection of a built-in type ear-microphone with a portable radio terminal according to a first embodiment of the present invention. Upon detecting insertion of a plug 200 (See FIG. 1a) into a jack 100 during a call, a undepicted central processing unit (CPU) of the portable radio terminal changes an audio processing path of a vocoder 137. That is, an audio processing path connected to a speaker amplifier AMP3 and a microphone amplifier AMP6 of the terminal is switched to amplifiers AMP4 and AMP5 of the ear-microphone (or hands-free kit for vehicle). When the audio processing path is switched, the signal input from the ear-microphone through pin 2 of the jack 100 is amplified into two-phase signals by amplifiers AMP8 and AMP9 and then input to the microphone amplifier AMP5 in the vocoder 137. Amplifier 8 amplifies the signals received from the microphone, and amplifier 9 both amplifies and changes the phase of the signal received by amplifier 8. In addition, two-phase signals output from the speaker amplifier AMP4 of the terminal are converted into a single-phase signal by a differential amplifier AMP7 and then output to an earphone of the ear-microphone through pin 3 of the jack 100, so that the user can hear the sound. At the same time, when the plug 200 is inserted in the jack 100, a detection signal representative of the plug inserted state is output from a second AND gate G2 and then provided to the CPU. That is, the second AND gate G2 ANDs an output of a first AND gate G1 and an output of a comparator COM1 to generate a jack detection signal JD3. The jack detection signal JD3 is an initial detection signal for generating a signal having a level appropriate for the ear-microphone. The comparator COM1 compares an electric signal sensed at pin 4 in the jack 100 with a reference voltage Vref. The first AND gate G1 ANDs an output of the differential amplifier AMP7, which converts the two-phase signals output from the speaker amplifier AMP4 of the terminal into a single-phase signal, and a signal input from the ear-microphone through pin 2 of the jack 100. By providing the first AND gate G1 connected as stated above, it is possible to avoid the unpleasant noises which are generated due to short-circuit between a microphone signal and a speaker signal while the plug 200 is inserted in the jack 100.

Figure 6:
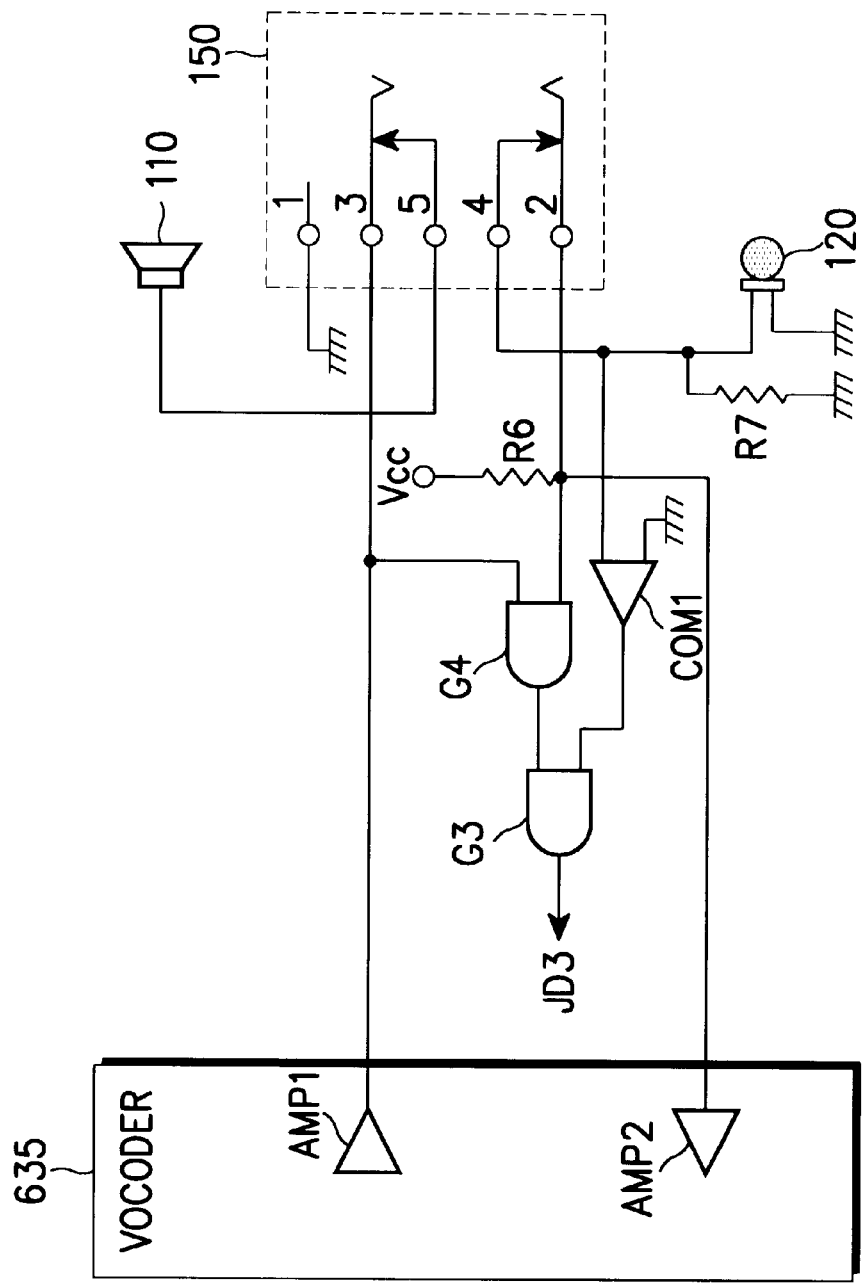
FIG. 6 is a diagram illustrating a device for connecting a built-in type ear-microphone to a portable radio terminal according to a second embodiment of the present invention.

FIG. 6 illustrates a device for controlling the connection of a built-in type ear-microphone with a portable radio terminal according to a second embodiment of the present invention. As illustrated, the device is similar in structure to the device of FIG. 5, except that separate amplifiers are not required in FIG. 6 since single-phase signals are used. In contrast, in FIG. 5, the separate amplifiers AMP7, AMP8 and AMP9 are required, since two-phase signals are used. In accordance with the above embodiments, it is possible to provide a device for controlling the connection of a built-in type ear-microphone, which is handy to carry, about with a CDMA portable radio terminal, and preventing generation of unpleasant noises even when the plug is inserted during a call.

Next, a description will be made with regard to a device for controlling the connection of a built-in type ear-microphone with a TDMA portable radio terminal, which can minimize susceptibility to TDMA noises, with reference to FIGS. 7, 8 and 9.

Figure 1B:
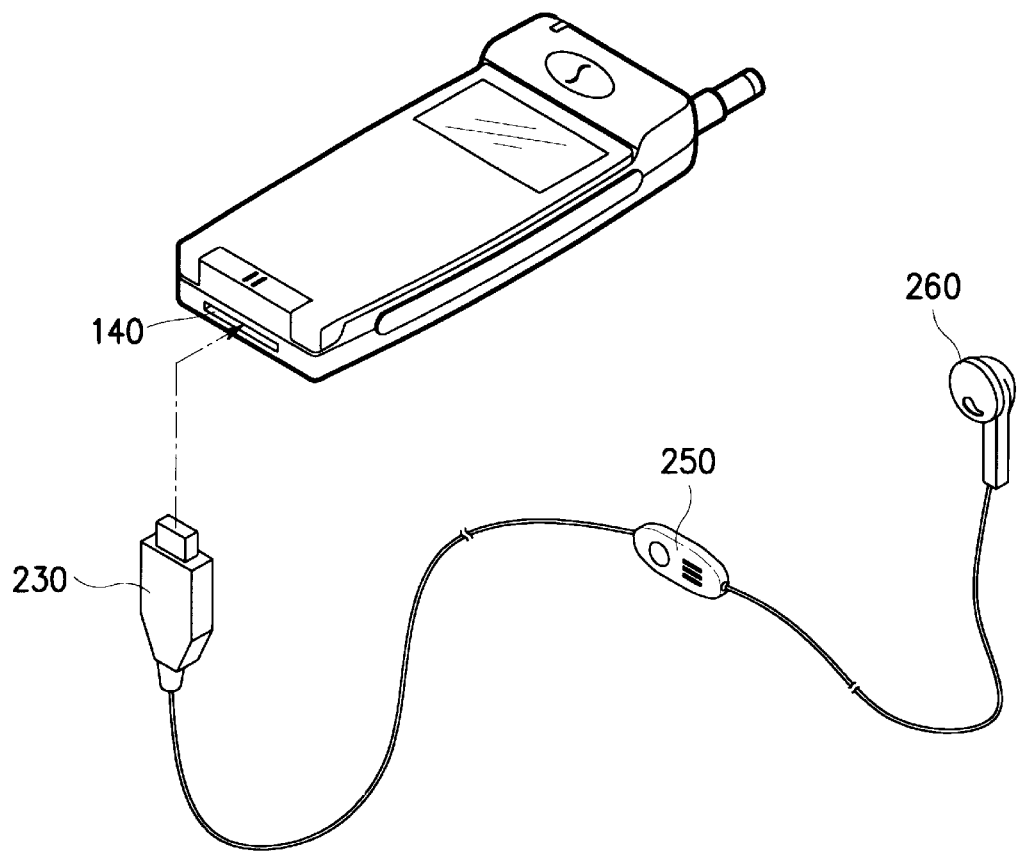
FIG. 1B is a perspective view illustrating the connection between a portable radio terminal and an external type ear-microphone.
Figure 2:
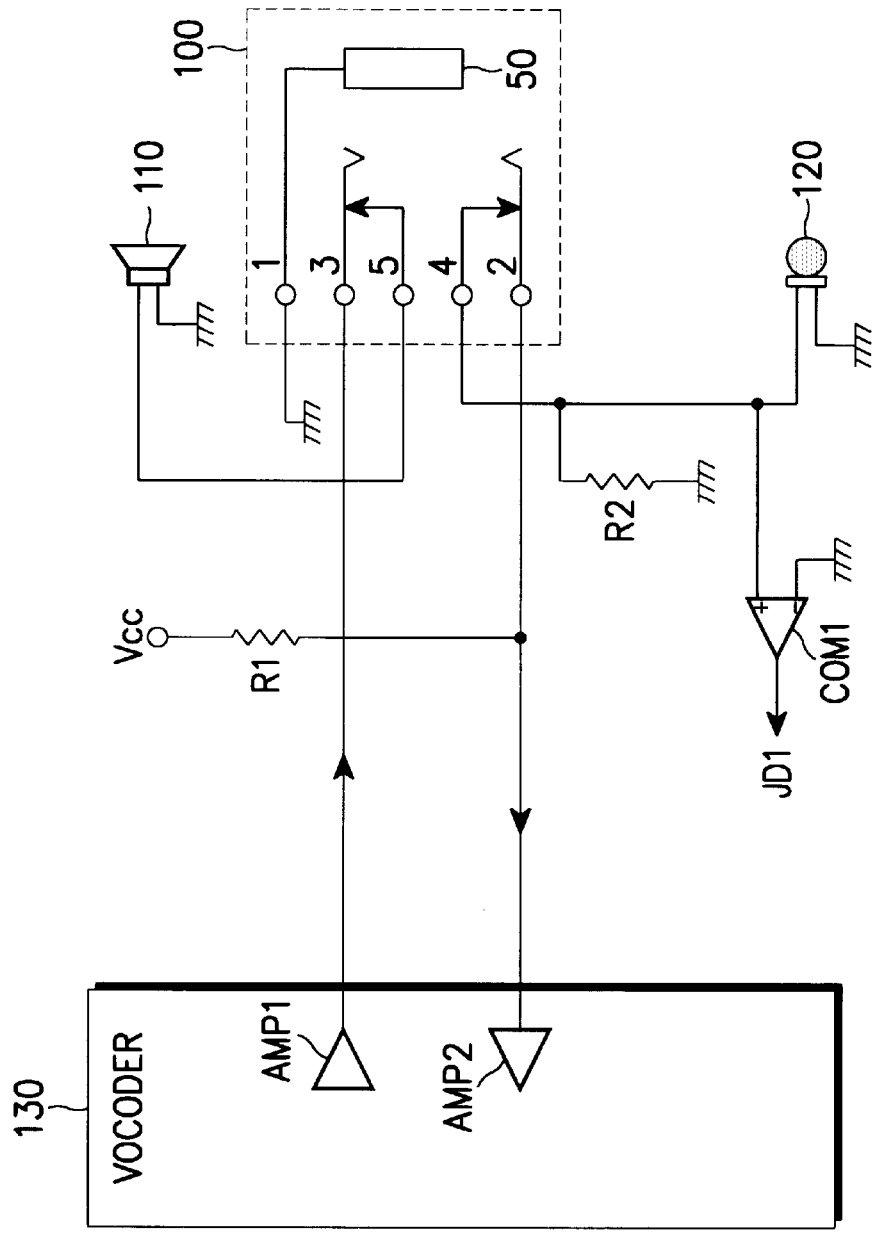
FIG. 2 is a diagram illustrating a conventional device for controlling the connection of a built-in type ear-microphone.
Figure 3:
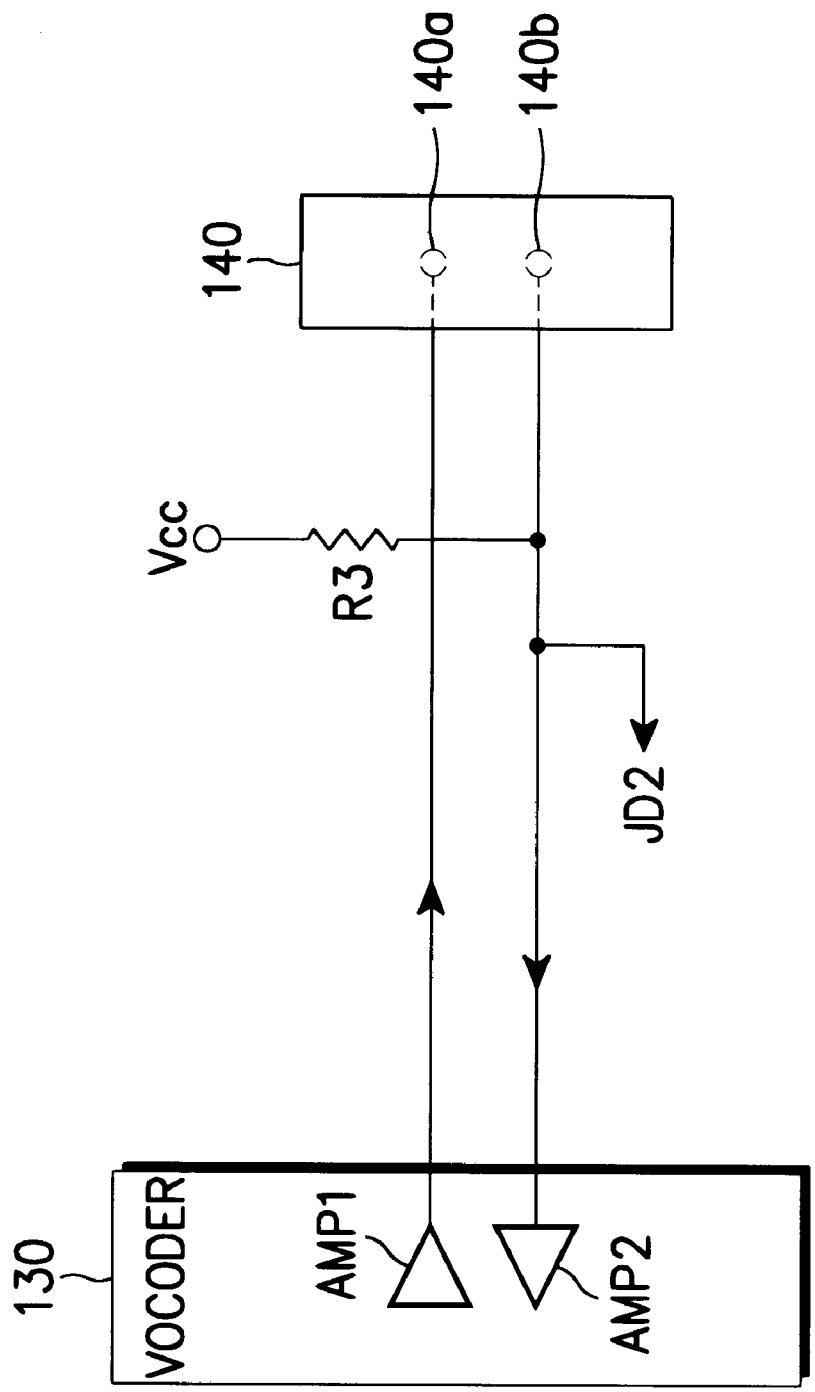
FIG. 3 is a diagram illustrating a conventional device for controlling the connection of an external type ear-microphone.
Figure 7:
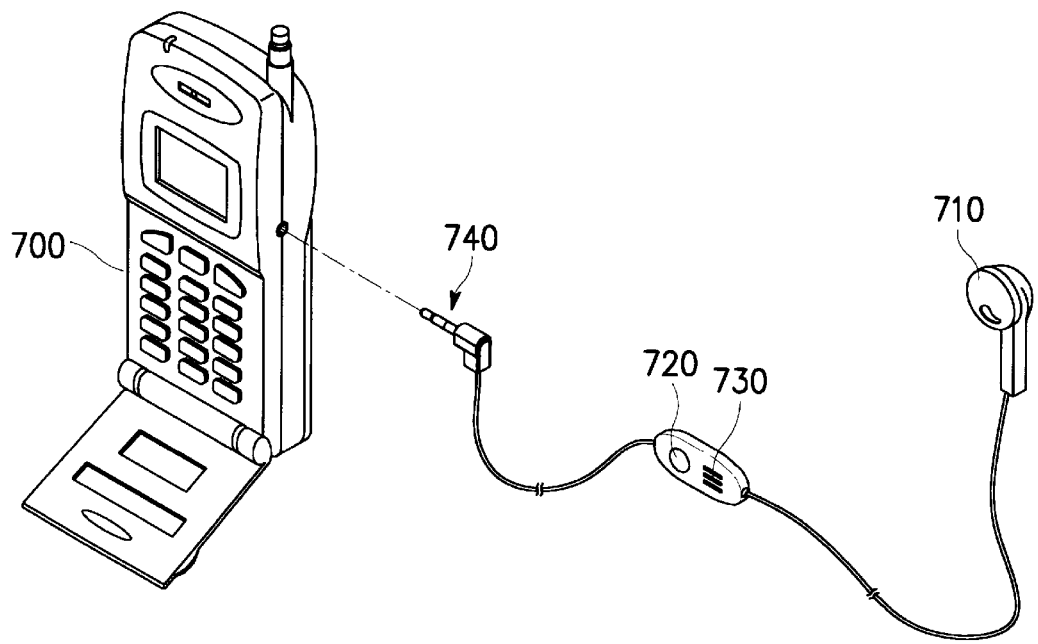
FIG. 7 is a diagram illustrating the connection between a TDMA portable radio terminal and a built-in type ear-microphone according to a third embodiment of the present invention.

FIG. 7 illustrates the connection between a TDMA portable radio terminal and a built-in type ear-microphone according to a third embodiment of the present invention. Referring to FIG. 7, a built-in type ear-microphone includes an earphone plug 740 which is inserted in an earphone jack of a TDMA portable radio terminal 700, a speaker .710, a microphone 730 and an earphone switch 720. The ear-microphone for the TDMA terminal of FIG. 7 is different from that of FIG. 1B in that the ear-microphone is inserted in the earphone jack of the TDMA terminal rather than in the interface connector. That is, the ear-microphone for the TDMA terminal of FIG. 7 is used in the same way as the ear-microphone for the CDMA terminal of FIG. 1A. This implies that the ear-microphone for the TDMA terminal according to the present invention does not require a separate chip for controlling an audio signal path. In the prior art, however, a voice path control chip is built in the plug 230 connected to the interface connector 140, causing inconvenience in carrying about the ear-microphone and increasing the production cost.

Figure 8:
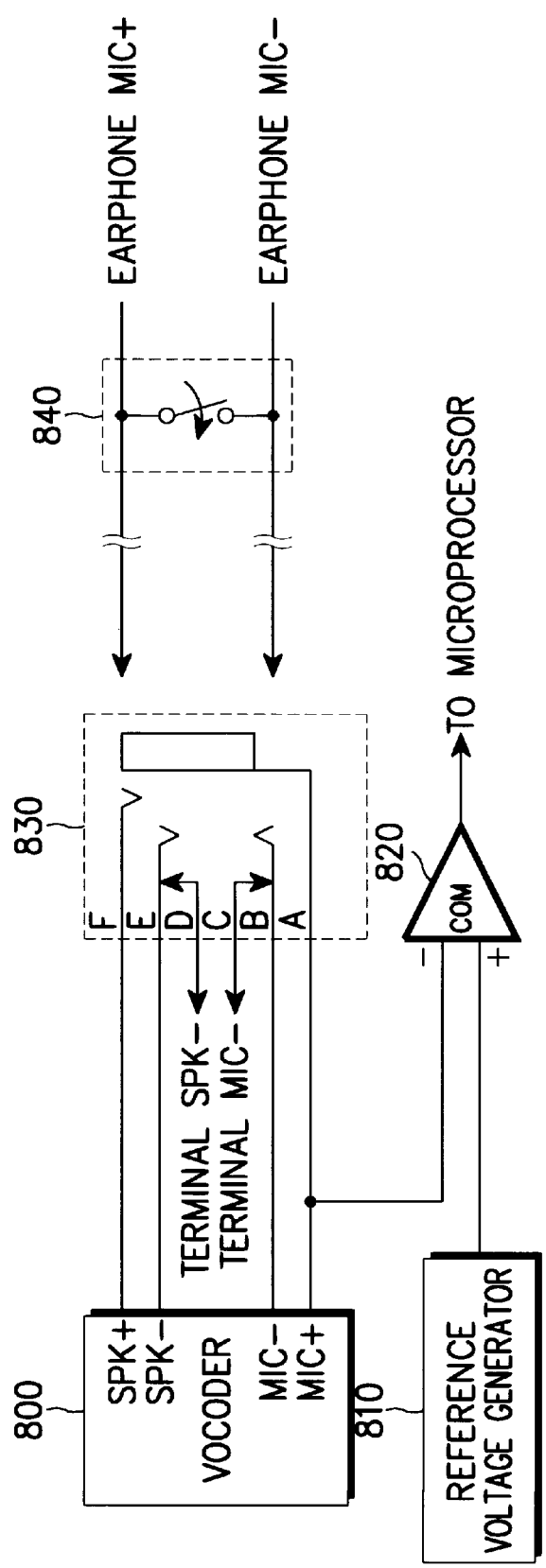
FIG. 8 is a diagram illustrating a device for controlling the connection of a built-in type ear-microphone with a TDMA portable radio terminal, which can detect switching of an earphone, according to a third embodiment of the present invention.

FIG. 8 illustrates a device for controlling the connection of a built-in type ear-microphone with a TDMA portable radio terminal, which can detect switching of an earphone, according to a third embodiment of the present invention. Referring to FIG. 8, a vocoder 800, which is typically implemented by a single chip, compresses input/output audio signals and has speaker nodes SPK+ and SPK− and microphone nodes MIC+ and MIC−. For these nodes, designated I/O nodes are typically used. A 4-pole 6-node earphone Jack 830 has a first node A connected to the MIC+ node of the vocoder 800, a second node B connected to the MIC− node of the vocoder 800, a third node C connected to a MIC− node of the portable radio terminal, a fourth node D connected to the a SPK− node of the portable radio terminal, a fifth node E connected to the SPK− node of the vocoder 800, and a sixth node F connected to the SPK+ node of the vocoder 800. Further, the first node A is also connected to an inverse input node (−) of a voltage comparator 820. The voltage comparator 820 compares input voltages and provides the results to a controller which is implemented by a microprocessor in the portable radio terminal. A reference voltage generator 810 generates a predetermined reference voltage and provides the generated reference voltage to the voltage comparator 820 through a non-inverse input node (+). An earphone, which is normally inserted in an earphone jack 830, includes an earphone speaker and an ear-microphone. Further, the earphone includes an earphone switch 840 for controlling various functions of the portable terminal, such as call start and call end functions. The earphone switch 840 is connected between an earphone MIC+ line and an earphone MIC− line. Though not illustrated, an earphone speaker line is also divided into a positive (+) speaker line and a negative (−) speaker line. Since the earphone device employs the double ended technique, the speaker node, the microphone node and the earphone line are divided into positive (+) and negative (−) sides, respectively.

Figure 4:
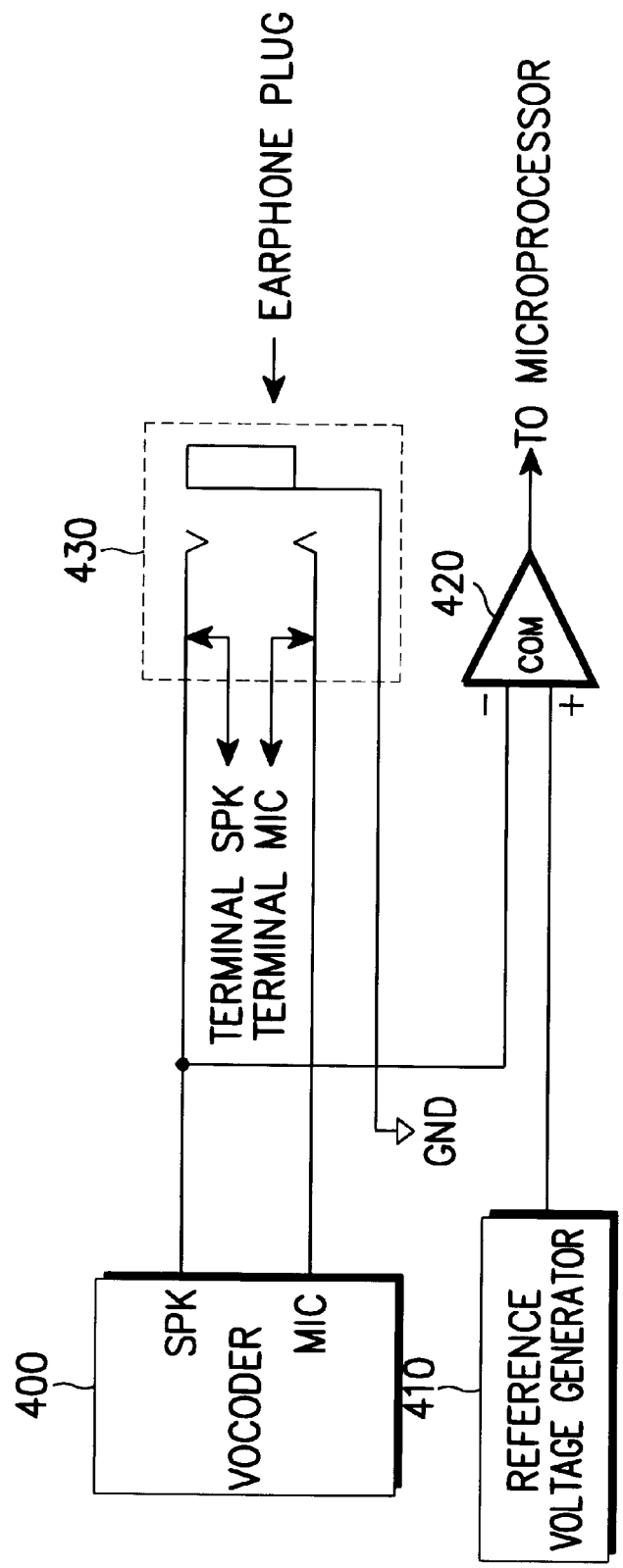
FIG. 4 is a diagram illustrating a conventional device for controlling the connection of a single ended ear-microphone for a TDMA portable radio terminal.

The conventional built-in type ear-microphone of FIG. 4 employs the single ended technique. In the third and fourth embodiments of the present invention, the double ended technique is used to minimize susceptibility to TDMA noises generated in the TDMA portable terminal. That is, even though instantaneous power consumption increases due to TDMA noises, the respective positive (+) and negative (−) nodes of the speaker and the microphone cancel the noises, so that the earphone device is less susceptible to TDMA noises. The double ended technique is well known in the art, so a detailed description will be avoided.

Now, a description will be made regarding the operation of detecting switching of the earphone in the device for controlling the connection of the built-in type ear-microphone with the TDMA portable radio terminal. When the earphone plug is inserted in the earphone jack 830, a specific bias voltage is generated between the. MIC+ node and the MIC− node of the vocoder 800. For example, in a common vocoder, the MIC− node has 2.2V and the MIC+ node has 0.3V. The reference voltage generator 810 generates a predetermined reference voltage and provides the generated reference voltage to the non-inverse input node (+) of the voltage comparator 820. For example, the reference voltage has a voltage level between 1V and 1.5V. In this state, if the earphone switch 840 is opened (i.e., turned OFF), a signal from the earphone is applied to the inverse input node (−) of the voltage comparator 820 against an inherent impedance 2.2 KΩ of the microphone lines of the earphone. The voltage at the inverse input node (−) becomes 0.3V. The voltage comparator 820 then compares a voltage at the inverse input node (−) with a voltage at the non-inverse input node (+) and provides the results to the controller, wherein the output of the voltage comparator 820 indicates that the earphone switch 840 is turned OFF.

Alternatively, when the earphone switch 840 is closed (i.e., turned ON), a bias voltage between the earphone MIC+ line and the earphone MIC− line is changed, an increased voltage level (e.g., 2.2V) is applied to the inverse input node (−) of the voltage comparator 820. The voltage comparator 820 then compares the applied voltage with the reference voltage received at the noninverse input node (+), and outputs the reverse results of the switch OFF state. For example, assuming that the voltage comparator 820 outputs a "high" signal when the earphone switch 840 is turned OFF, and a "low" signal when the earphone switch 840 is turned ON, the voltage comparator 820 will output the "low" signal to the controller. The controller then performs a corresponding operation according to the signal output from the voltage comparator 820. For example, the corresponding operation stated above includes call start, call end, and voice recognition start functions. That is, it is possible to detect switching of the earphone switch 840 depending on the output of the voltage comparator 820. The above operation is performed in the state where the earphone plug is inserted in the earphone jack 830. When the earphone plug is not inserted, the operation of detecting switching of the earphone switch is not performed, thereby avoiding unnecessary power consumption.

Figure 9:
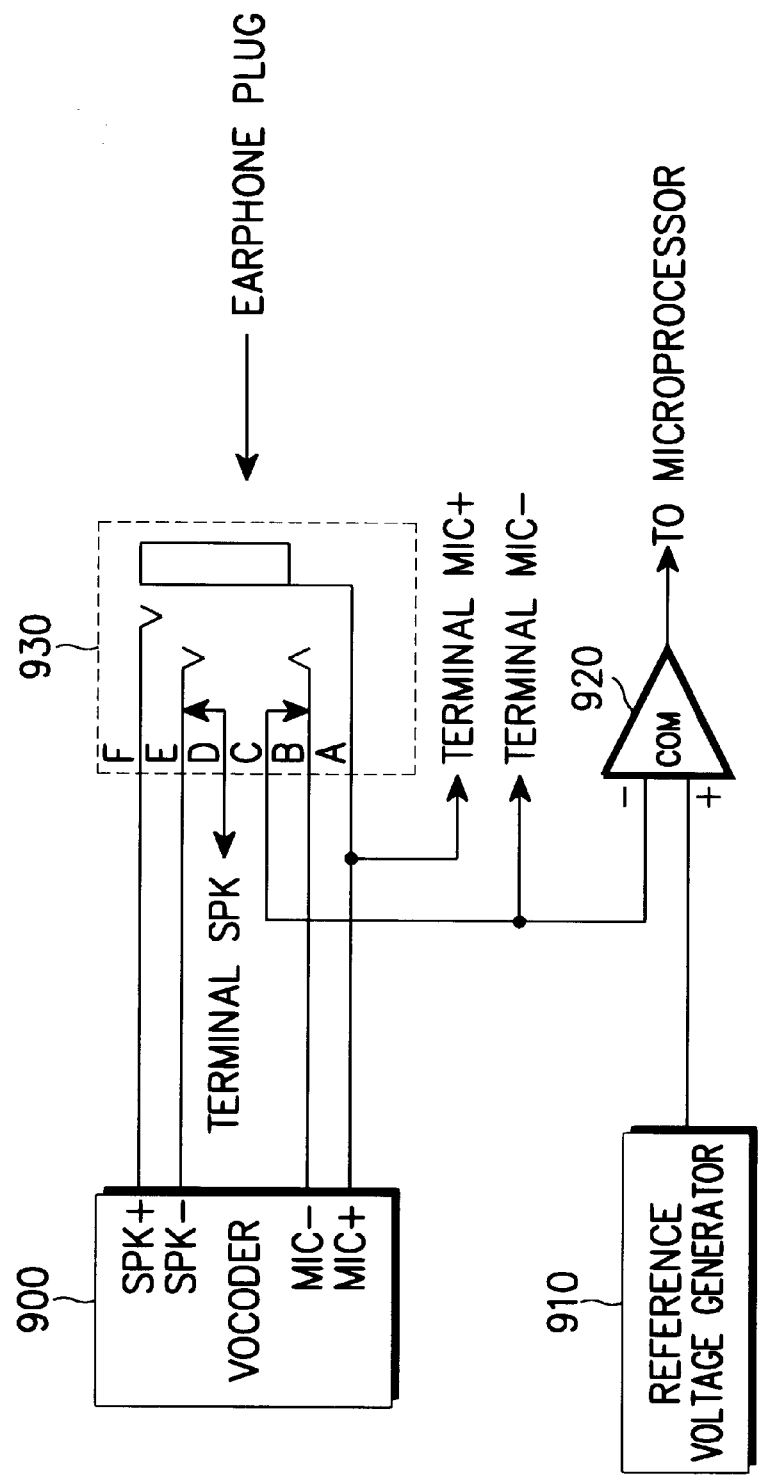
FIG. 9 is a diagram illustrating a device for controlling the connection of a built-in type ear-microphone with a TDMA portable radio terminal, which can detect insertion of an earphone, according to a fourth embodiment of the present invention.

FIG. 9 illustrates a device for controlling the connection of a built-in type ear-microphone with a TDMA portable radio terminal, which can detect insertion of an earphone, according to a fourth embodiment of the present invention. In FIG. 9, a vocoder 900, a reference voltage generator 910, a voltage comparator 920 and an earphone jack 930 have the same structures and functions as those in FIG. 8. However, a third node C of the earphone jack 930 is commonly connected to an inverse input node (−) of the voltage comparator 920 and a MIC− node of the terminal. Further, a first node A is connected to a MIC+ node of the terminal. This connection is used to detect insertion of the earphone plug.

A description will now be made regarding an operation of detecting insertion of the earphone according to a fourth embodiment of the present invention. First, the reference voltage from the reference voltage generator 910 is provided to the voltage comparator 920. Further, when the earphone plug is not inserted in the earphone jack 930, the third node C is connected to the second node B, so that a bias voltage from the MIC− node of the vocoder 900 is applied to the inverse input node of the voltage comparator 920. At this point, since the voltage level applied to the inverse input node (−) of the voltage comparator 920 is higher than the reference voltage on the non-inverse input node (+), the voltage comparator 920 will output a "low" signal and provide the output signal to the controller. The controller then sets the audio signal path of the vocoder 900 to the speaker and microphone in the portable terminal body. On the other hand, if the earphone plug is inserted in the earphone jack 930, fourth and fifth nodes D and E of the earphone jack 930 are disconnected from each other and the third node C is floated to 0V. The voltage comparator 920 compares the floated voltage 0V with the reference voltage and outputs a "high" signal. The controller then recognizes insertion of the earphone plug and performs a corresponding operation.

As described above, the device according to the present invention has the following advantages.

(1) It is possible to prevent generation of the unpleasant noises, even though the ear-microphone is inserted in the portable radio terminal during a call.

(2) It is convenient to carry the ear-microphone as well as the portable radio terminal with the ear-microphone inserted therein.

(3) The built-in type ear-microphone can be used for a TDMA portable radio terminal and is less susceptible to TDMA noises.

(4) The device for controlling the connection of the built-in type ear-microphone can detect insertion of the earphone and switching of the earphone.

While the invention has been shown and described with reference to certain preferred embodiments thereof, it will be understood by those skilled. in the art that various changes in form and details may be made therein without departing from the spirit and scope of the invention as defined by the appended claims.

What is claimed is:

1. A device for controlling the connection of a built-in type ear-microphone with a portable radio terminal, the ear-microphone including a speaker and microphone, and the portable radio terminal including a speaker and microphone, the device comprising:

a vocoder including speaker and microphone amplifiers of the portable radio terminal and speaker and microphone amplifiers of the ear-microphone;

a first logic combination means for logically combining a signal output from the ear-microphone speaker amplifier and a signal output from the ear-microphone microphone so as to prevent generation of noises due to a short-circuit of a microphone signal and a speaker signal when an ear-microphone plug is inserted in an ear-microphone jack;

a comparator for comparing an electric signal sensed at the ear-microphone jack with a reference voltage;

a second logic combination means for logically combining an output of the first logic combination means and an output of the comparator to generate a jack detection signal; and a central processing unit for generating a control signal for enabling the vocoder to switch an audio signal path from the portable radio terminal amplifiers to the ear-microphone amplifiers, upon detection of the jack detection signal during a call.

2. The device of claim 1, wherein the speaker and microphone amplifiers of the portable radio telephone and the speaker and microphone amplifiers of the ear-microphone both use two-phase signals.

3. The device of claim 2, further comprising:

a fifth amplifier for differentially amplifying and converting the two-phase output from the ear-microphone speaker amplifier into a single phase output to the ear-microphone speaker; and a sixth and seventh amplifiers for amplifying and converting the single-phase input from the ear-microphone microphone into a two-phase signal for the ear-microphone microphone amplifier;

wherein the first logic combination means combines the output of the fifth amplifier and the ear-microphone microphone.

4. A device for controlling the connection of a built-in type ear-microphone with a portable radio terminal, the ear-microphone including a speaker and microphone, and the portable radio terminal including a speaker and microphone, the device comprising:

a vocoder including a speaker amplifier and a microphone amplifier of the portable radio terminal;

a first logic combination means for logically combining a signal output from the speaker amplifier and a signal output from the ear-microphone microphone so as to prevent generation of noises due to a short-circuit of a microphone signal and a speaker signal when an ear-microphone plug is inserted in an ear-microphone jack;

a comparator for comparing an electric signal sensed at the ear-microphone jack with a reference voltage;

a second logic combination means for logically combining an output of the first logic combination means and an output :of the comparator to generate a jack detection signal; and a central processing unit for generating a control signal for enabling the vocoder to switch an audio signal path to the ear-microphone, upon detection of the jack detection signal during a call.

5. A device for controlling the connection of a built-in type ear-microphone with a time division multiple access (TDMA)-portable radio terminal, the ear-microphone including a speaker and microphone, and the portable radio terminal including a speaker and microphone, the device comprising:

- a vocoder including positive and negative nodes for a speaker and a microphone, for processing audio signals input and output from or to the nodes;
- a doubled ended 4-pole 6-node ear-microphone jack for connecting, upon insertion of an ear-microphone plug, a positive line of an ear-microphone microphone to a microphone positive node of the vocoder through a first node, connecting a negative line of the ear-microphone microphone to a microphone negative node through a second node, and disconnecting the second node from a third node, said third node connected to the negative line of the portable radio terminal microphone; and
- a voltage comparator for comparing a voltage input through the first node with a reference voltage, to detect a switching of an ear-microphone switch and insertion of the ear-microphone plug.

6. The device of claim 5, wherein said voltage comparator does not perform the operation of detecting an ear-microphone switch, unless the insertion of the ear-microphone plug is detected.

7. The device of claim 5, wherein the ear-microphone switch comprises a switch between the positive line of the ear-microphone microphone and the negative line of the ear-microphone microphone.

8. A device for controlling the connection of a built-in type ear-microphone with a time division multiple access (TDMA) portable radio terminal, the ear-microphone including a speaker and microphone, and the portable radio terminal including a speaker and microphone, the device comprising:

- a vocoder including positive and negative nodes for a speaker and a microphone, for processing audio signals input and output from/to the nodes;
- a doubled ended 4-pole 6-node ear-microphone jack for connecting, upon insertion of an ear-microphone plug, a positive line of an ear-microphone microphone to a microphone positive node of the vocoder through a first node, connecting a negative line of the ear-microphone microphone to a microphone negative node through a second node, and disconnecting the second node from a third node, said third node connected to the negative line of the portable radio terminal microphone; and
- a voltage comparator for comparing a voltage input through the third node with a reference voltage, to detect an insertion of the ear-microphone plug.

* * * * *

UNITED STATES PATENT AND TRADEMARK OFFICE
CERTIFICATE OF CORRECTION

PATENT NO. : 6,397,087 B1
DATED : May 28, 2002
INVENTOR(S) : Dong-Ho Kim et al.

It is certified that error appears in the above-identified patent and that said Letters Patent is hereby corrected as shown below:

<u>Title page,</u>
Item [30], Foreign Application Priority Data, should read as follows:
-- Nov. 7, 1998 (KR)....................................... 98-47903
   Nov. 7, 1998 (KR)....................................... 98-47904 --

Signed and Sealed this

Fourth Day of February, 2003

JAMES E. ROGAN
*Director of the United States Patent and Trademark Office*